United States Patent Office 3,763,283
Patented Oct. 2, 1973

3,763,283
N-HYDROXYMETHYLATED DIALKYL PHOSPHONOALKYL CARBAMATES
Mark N. Curgan, Greenville, S.C., assignor to
C. H. Patrick & Co., Inc., Greenville, S.C.
No Drawing. Filed Oct. 17, 1969, Ser. No. 870,423
Int. Cl. C07f 9/40
U.S. Cl. 260—938                                      3 Claims

ABSTRACT OF THE DISCLOSURE

Novel compositions suitable for use as flame retardants and having insecticidal properties, N-hydroxymethylated dialkyl phosphonoalkyl carbamates and N-hydroxymethylated di(haloalkyl) phosphono alkyl carbamates.

---

This invention relates to a new composition useful as a flame retardant having the formula:

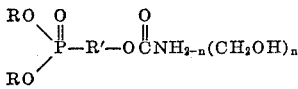

where

R is alkyl or haloalkyl having 1–4 carbon atoms
R' is an alkylene group having 2–4 carbon atoms
$n$ is 1 or 2

A new class of compounds of the type, N-hydroxymethylated dialkyl phosphono alkyl carbamates has been synthesized.

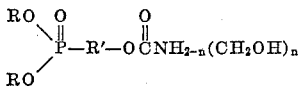

where

R is alkyl or haloalkyl having 1–4 carbon atoms
R' is an alkylene group having 2–4 carbon atoms
$n$ is 1 or 2

When applied to cellulosic materials, such as cotton, Dacron-cotton blends, paper, rayon or wood, these compounds impart an improved degree of durable flame resistance. These monomers are thought to be reacted with cellulosic fiber and upon application to the fabric and curing impart improved flame resistance. These compounds are useful in making flame resistant fabric, paper, wooden products, and urethane foams. Fabrics on which the combination is useful include those constructed of natural fibers, synthetic fibers and/or blends. These compounds also have insecticidal properties.

The N-hydroxymethylated dialkylphosphonoalkyl carbamates can be prepared in a two step process involving the initial reaction of a chloralkyl carbamate with a trialkyl phosphite, to form an intermediate dialkylphosphonoalkyl carbamate, according to the following general reaction:

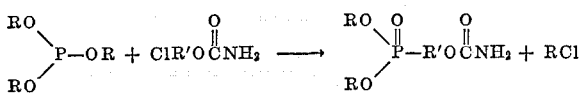

This intermediated product is then hydroxymethylated by reaction with either one or two mol equivalents of formaldehyde or paraformaldehyde so as to produce the desired hydroxylated dialkylphosphonoalkyl carbamate.

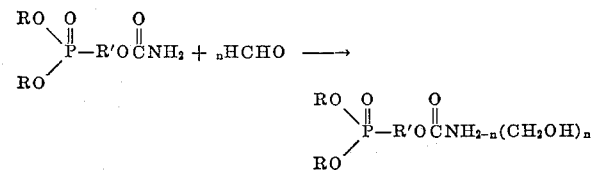

where

R is alkyl or haloalkyl having 1–4 carbon atoms
R' is an alkylene group having 2–4 carbon atoms
$n$ is 1 or 2

In further accord with this invention, the hydroxymethylated dialkylphosphonoalkyl carbamates prepared by the above reactions are employed as flameproofing agents for cellulosic fibrous material by incorporating the product in a finishing composition consisting of an aqueous solution or emulsion containing a thermosetting resin forming compound, at least one of the flame-retardant compounds of the invention, and preferably, an acid producing catalyst such as those commonly used in conjunction with the production of thermosetting resins or with the impregnating of textile materials by thermosetting resin-forming compounds. Such a pad bath also preferably includes a compatible conventional soil release composition. Suitable catalysts, for example, may include ammonium chloride, 2-amino-2-methylpropanol-1-hydrochloride, zinc nitrate, magnesium chloride, magnesium fluoroborate, and the like. Of the thermosetting resin-forming compounds suitable for use in the invention, particularly good results can be achieved using aminoplastic resin-forming compound, such as the 1,3-dimethylol-5-alkyl-perhydrotriazone, urea formaldehyde, melamine-formaldethyde, tetramethylol acetylene diureine, 1,3-dimethylol-4,5-dihydroxy ethyleneurea, etc. Other resin-forming compounds which may be used include acrylates, polyesters, and silicones.

More particularly, the finishing compositions of this invention are generally comprised of from 0 to 15 percent by weight and preferably from about 3 to about 12 percent by weight of the thermosetting resin-forming compound, from 10 to 50 percent by weight and preferably 20 to 40 percent by weight of the flame retardant compound, from 0.25 percent to 3 percent by weight and preferably from about 0.5 percent to 2.5 percent by weight of said acid producing catalyst, water being the principal remaining constituent of the finishing composition.

The finishing composition may contain other additives, as desired, to achieve additional desired properties. Such additives may consist of softening agents, bodying agents, surface active agents, water repelling agents, etc.

The following is typical of such a finishing composition:

|  | Percent by wt. |
|---|---|
| Flame retardant compound | 40. |
| Thermosetting resin-forming compound | 5 |
| Urea | 1 |
| Softening agent | 0.6 |
| Acid producing catalyst | 0.4 |
| Water | 53.0 |
|  | 100.0 |

Further examples are as follows:

EXAMPLE I

Preparation of 2-(dimethylphosphono) ethyl-1-carbamate 300 g. (2.4 mol) of 2 - chlorethyl-1-carbamate, 301 g. (2.4 mol) of trimethyl phosphite, and 5 g. of triethylamine were charged to a 1 liter round bottomed flask equipped with a stirrer, reflux condenser, and thermometer. The reaction mixture was heated at reflux with slow evolution of methyl chloride. When methyl chloride evolution was substantially complete, the residue was cooled. It consisted of substantially pure 2-(dimethylphosphono) ethyl-1-carbamate.

Yield: Theoretical
Nitrogen: Found, 7.14%; calculated, 7.1%

EXAMPLE II

Preparation of N-hydroxymethyl-2-(dimethylphosphono) ethyl-1-carbamate

To 40.6 g. (0.5 mol) of 37% formalin, there was added 0.15 g. of anhydrous disodium phosphate, followed by slow addition, with agitation, of 98.6 g. (0.5 mol) of 2-(dimethylphosphono) ethyl-1-carbamate. During this addition, the pH of the solution was maintained between 6.5 and 7.5 by addition, as needed, of 10% sodium carbonate solution. The reaction was exothermic. After stirring for one-half hour, no free formaldehyde was detected.

The resulting solution was composed of approximately 75% N-hydroxymethyl-2-(dimethylphosphono) ethyl-1-carbamate.

EXAMPLE III

Preparation of N,N-di(hydroxymethyl)-2-(dimethylphosphono) ethyl-1-carbamate

To 71.1 g. (0.87 mol) of 37% formalin, there was added 0.22 g. of anhydrous disodium phosphate. To this solution there was slowly added, with constant stirring, 98.6 g. (0.5 mol) of 2-(dimethylphosphono) ethyl-1-carbamate. The pH of the solution was maintained at 6.5–7.5 by addition, as needed, of 10% sodium carbonate solution. After stirring for one-half hour, the free formaldehyde content of the solution had been reduced to 3.5%, and the product contained therein consisted primarily of N,N-di(hydroxymethyl)-2-(dimethylphosphono) ethyl-1-carbamate.

EXAMPLE IV

Application of N-hydroxymethyl and N,N-di(hydroxymethyl)-2-(dimethyl-phosphono) ethyl-1-carbamate to fabric for flame retardant purposes Pad baths were prepared of the following composition:

| | Percent by wt. |
|---|---|
| N-hydroxymethyl, or N,N-dihydroxymethyl-2-phosphoro) ethyl-1-carbamate | [1] 25 to 50 |
| Aerotex Resin 23, Special [2] | 5 |
| Urea | 1 |
| Fabritone PE [3] | 0.6 |
| Ammonium chloride | 0.4 |
| Water q.s. 100. | |

[1] Since fabrics of different construction were treated, the amount of flameproofer varied to compensate with varying pickup of fabric upon padding, in order that a resulting 40 percent of flameproofer on weight of fabric would occur.
[2] American Cyanamid Company (trimethylol melamine).
[3] C. H. Patrick & Co. (a polyethylene emulsion).

A lightweight white broadcloth, a khaki medium weight fabric, and a flannel fabric were treated with the pad bath described above. The fabric was air dried, cured by heating at 350° F. for 1 minute and 40 seconds. The fabric was afterwashed, then conditioned at 70° F. and 65% relative humidity before testing for flame-proofing. The efficiency of the treatments was determined by Test Method AATCC 34–1966, "Fire Resistance of Textile Fabrics."

Durability to laundering of the treatment was determined by periodic testing after a series of home launderings, as indicated in the table. The results of these tests are shown in Table I.

TABLE I.—FIRE RESISTANCE OF FABRIC

| Fabric | Number of washes | | | | | | | | | | | | | | | | | | | | | |
|---|---|---|---|---|---|---|---|---|---|---|---|---|---|---|---|---|---|---|---|---|---|---|
| | 0 | | | 5 | | | 10 | | | 15 | | | 20 | | | 25 | | | 35 | | | |
| | AF | AG | CL | AF | AG | CL | AF | AG | CL | AF | AG | CL | AF | AG | CL | AF | AG | CL | AF | AG | CL | |
| Flameproofer applied at 40% on weight of fabric: | | | | | | | | | | | | | | | | | | | | | | |
| N-hydroxymethyl-2-(dimethylphosphono) ethyl-1-carbamate | 0 | 0 | 5 | 0 | 0 | 4⅞ | 0 | 0 | 3⅝ | 0 | 0 | 5 | 0 | 0 | 5¼ | 0 | 0 | 4¹¹⁄₁₆ | 0 | 0 | 6⅞ | |
| | 0 | 0 | 5⅞ | 0 | 0 | 4¼ | 0 | 0 | 3¾ | 0 | 0 | 4¹⁄₁₆ | 0 | 0 | 2¾₁₆ | 0 | 0 | 4¼ | 0 | 0 | 4¼ | |
| N,N-dihydroxymethyl-2-(dimethylphosphono) ethyl-1-carbamate | --- | --- | --- | 0 | 0 | 4¾ | 0 | 0 | 3¼ | 0 | 0 | 5⅜ | 0 | 0 | 5¼ | 1 | 0 | 4¹¹⁄₁₆ | 0 | 0 | 5¼ | |
| | 0 | 0 | 5¾ | 0 | 0 | 3 | 0 | 0 | 5⅜ | 0 | 0 | 4 | 0 | 0 | 3¹⁄₁₆ | 0 | 0 | 4⅝ | 0 | 0 | 4¼ | |
| | 0 | 0 | 3¾ | 0 | 0 | 3¾ | 0 | 0 | 3¼ | 0 | 0 | 4¾ | 0 | 0 | 3¹⁄₁₆ | 0 | 0 | 3⅜ | 0 | 0 | 3¾ | |
| Untreated fabric | } Burned completely and rapidly, entirely destroying the skeletal structure of the fabric | | | | | | | | | | | | | | | | | | | | | |

Abbreviations:
AF=Afterflame, expressed in seconds.
AG=Afterglow, expressed in seconds.
CL=Charlength, expressed in inches.

EXAMPLE V

Preparation of 2-(diethylphosphono) ethyl-1-carbamate 123.6 g. (1 mol) of 2-chlorethyl-1-carbamate, 166.2 g. (1 mol) of triethyl phosphite, and 3 g. of triethylamine were charged to a 500 ml. round bottom flask, equipped with thermometer, reflux condenser, and stirrer, and heated at 140° C., until a weight loss of 64.5 g., equivalent to one mol of ethyl chloride, was obtained. The residue consisted of 2-diethylphosphono ethyl-1-carbamate.

EXAMPLE VI

Preparation of 2-(diisopropylphosphono) ethyl-1-carbamate 123.6 g. (1 mol) of 2-chlorethyl-1-carbamate, 208.2 g. (1 mol) of triisopropyl phosphite, and 3 g. of triethylamine were heated to 150° C., until a loss of weight of 78.5 g., equivalent to one mol of isopropyl chloride, was obtained. The residue consisted of 2-(diisopropylphosphono) ethyl-1-carbamate.

EXAMPLE VII

Preparation of 2-(di-2-chlorethylphosphono) ethyl-1-carbamate 123.6 g. (1 mol) of 2-chlorethyl-1-carbamate, 269.5 g. (1 mol) of tri (2-chlorethyl) phosphite, and 5 g. of triethylamine were heated at 150° C., until a loss in weight of 99 g., equivalent to one mol of ethylene dichloride, had occurred. The residue consisted of 2-(di-2-chlorethylphosphono) ethyl-1-carbamate.

EXAMPLE VIII

Preparation of 3-(dimethylphosphono) propyl-1-carbamate 137.6 g. (1 mol) of 3-chloropropyl-1-carbamate, 124.1 g. (1 mol) of trimethyl phosphite, and 2.2 g. of triethylamine were heated to 125° C. until a loss of 50.5 g., equivalent to one mol of methylchloride had occurred. The residue consisted of 3-(dimethylphosphono) propyl-1-carbamate.

EXAMPLE IX

Preparation of 4-(dimethylphosphono) butyl-1-carbamate 151.6 g. (1 mol) of 4-chlorbutyl carbamate, 124.1 g. (1 mol) of trimethyl phosphite, and 2.5 g. of triethylamine were heated at 135° C., until a loss of weight of 50.5 g., equivalent to one mol of methyl chloride had occurred. The residue consisted of 4-(dimethylphosphono) butyl-1-carbamate.

EXAMPLE X

Preparation of N-hydroxymethyl dialkylphosphonoalkyl carbamates

One gram mol, respectively, of each of the dialkylphosphonoalkyl carbamates, synthesized as in Examples II through VI, is represented by the following weights:

|  | G. |
|---|---|
| 2-(diethylphosphono) ethyl-1-carbamate | 225.1 |
| 2-(diisopropylphosphono) ethyl-1-carbamate | 253.1 |
| 2-[di-(2-chlorethylphosphono)] ethyl-1-carbamate | 294.1 |
| 3-(dimethylphosphono) propyl-1-carbamate | 211.1 |
| 4-(dimethylphosphono) butyl-1-carbamate | 225.1 |

To 81.1 g. (1 mol) of 37% formaldehyde solution, 0.34 g. of anhydrous dibasic sodium phosphate was added, followed, with stirring, by the slow addition of 1 gram mol of the respective carbamate. During this addition, the pH of the solution was held at 7 by the addition, as needed, of 10 percent sodium carbonate solution. The end of the reaction was indicated by no further decrease in the free formaldehyde content of the solutions. The resulting solutions contained the respective N-hydroxymethyl dialkylphosphonoalkyl carbamates.

EXAMPLE XI

Application of N-hydroxymethyl (dialkylphosphono) alkyl carbamates to fabric for flame retardant purposes Pad baths were prepared of the following composition:

|  | Percent by wt. |
|---|---|
| N-hydroxymethyl (dialkylphosphono) alkyl carbamate [1] | [2] 25 to 50 |
| Aerotex Resin 23, Special [3] | 5 |
| Urea | 1 |
| Fabritone PE [4] | 0.6 |
| Ammonium chloride | 0.4 |
| Water q.s. | 100.0 |

[1] The following materials were used:
N-hydroxymethyl-2-(dimethylphosphono) ethyl-1-carbamate
N-hydroxymethyl-2-(diethylphosphono) ethyl-1-carbamate
N-hydroxymethyl-2-(diisopropylphosphono) ethyl-1-carbamate
N-hydroxymethyl-2-[di-(2-chlorethyl) phosphono] ethyl-1-carbamate
N-hydroxymethyl-3-(dimethylphosphono) propyl-1-carbamate
N-hydroxymethyl-4-(dimethylphosphono) butyl-1-carbamate
[2] Since fabrics of different construction were treated, the amount of flameproofer varied to compensate with varying pickup of fabric upon padding, in order that a resulting 40 percent of flameproofer on weight of fabric would occur.
[3] American Cyanamid Company (trimethylol melamine).
[4] C. H. Patrick & Co. (a polyethylene emulsion).

A lightweight white broadcloth and a khaki medium weight fabric, were treated with the pad bath described above. The fabric was air dried, cured by heating at 350° F. for 1 minute and 40 seconds. After the first and fifth laundering, the fabric was conditioned at 70° F. and 65% relative humidity before testing for flame-proofing. The efficiency of the treatments was determined by Test Method AATCC 34–1966, "Fire Resistance of Textile Fabrics."

The results of these tests are shown in Table II.

TABLE II.—FIRE RESISTANCE OF FABRIC

| | | Number of washes | | | | | |
|---|---|---|---|---|---|---|---|
| | | 1 | | | 5 | | |
| | Fabric | AF | AG | CL | AF | AG | CL |
| Flameproofer applied at 40% o.w.f.: | | | | | | | |
| N-hydroxymethyl-2-(dimethylphosphono)ethyl-1-carbamate | White broadcloth | 0 | 0 | 3⅞ | 0 | 0 | 3 |
| | Khaki | 0 | 0 | 2½ | 0 | 0 | 3 |
| N-hydroxymethyl-2-(diethylphosphono)ethyl-1-carbamate | White broadcloth | BEL | | | BEL | | |
| | Khaki | 20 | 0 | BEL | BEL | | |
| N-hydroxymethyl-2-(diisopropylphosphono)ethyl-1-carbamate | White broadcloth | BEL | | | BEL | | |
| | Khaki | 0 | 0 | 5 | 15 | 0 | BEL |
| N-hydroxymethyl-2-[di-(2-chlorethyl)phosphono]ethyl-1-carbamate | White broadcloth | BEL | | | BEL | | |
| | Khaki | BEL | | | BEL | | |
| N-hydroxymethyl-3-(dimethylphosphono)propyl-1-carbamate | White broadcloth | BEL | | | BEL | | |
| | Khaki | BEL | | | BEL | | |
| N-hydroxymethyl-4-(dimethylphosphono) butyl-1-carbamate | White broadcloth | BEL | | | BEL | | |
| | Khaki | BEL | | | BEL | | |
| Untreated | White broadcloth | TC | | | | | |
| | Khaki | TC | | | | | |

Abbreviations:
o.w.f.=on weight of fabric.
AF=after-flame, expressed in seconds.
AG=afterglow, expressed in seconds.
CL=charlength, expressed in inches.
BEL=burned entire length, but skeletal structure of fabric entirely preserved. Burned very slowly.
TC=burned entire length, rapidly. Skeletal structure of fabric entirely destroyed.

What is claimed is:
1. A composition of matter, N-hydroxymethylated dialkyl phosphono alkyl carbamate, of the formula:

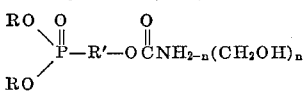

where
R is alkyl or haloalkyl having 1–4 carbon atoms
R' is an alkylene group having 2–4 carbon atoms
$n$ is 1 or 2

2. N-hydroxymethyl - 2-(dimethylphosphono) ethyl-1-carbamate.

3. N,N-di(hydroxymethyl) - 2 - (dimethylphosphono) ethyl-1-carbamate.

References Cited
UNITED STATES PATENTS 3,069,312  12/1962  Kohn _____ 260—938 X
3,365,530  1/1968   Bahr et al. _____ 260—938 X LEWIS GOTTS, Primary Examiner
R. L. RAYMOND, Assistant Examiner U.S. Cl. X.R.
117—136; 252—8.1; 260—29.2 N, 45.9 R, 968, 969